United States Patent

Petersen et al.

Patent Number: 5,822,321
Date of Patent: Oct. 13, 1998

[54] MINICELL SEGMENTATION AND REASSEMBLY

[75] Inventors: Lars-Göran Petersen, Tumba; Lars Göran Wilhelm Eneroth, Tyresö, both of Sweden

[73] Assignee: Telefonaktiebolaget LM Ericsson, Stockholm, Sweden

[21] Appl. No.: 630,578

[22] Filed: Apr. 10, 1996

[51] Int. Cl.[6] .................................................. H04J 3/24
[52] U.S. Cl. ........................ 370/474; 370/476; 370/471
[58] Field of Search .................... 370/94.1, 94.2, 370/99, 82, 83, 112, 300, 395, 466, 468, 471, 474, 476, 905; 395/849

[56] References Cited

U.S. PATENT DOCUMENTS

| | | | |
|---|---|---|---|
| 3,772,475 | 11/1973 | Loffreda | 179/15 BS |
| 4,999,835 | 3/1991 | Lagoutte | 370/94.1 |
| 5,420,858 | 5/1995 | Marshall et al. | 370/60.1 |
| 5,541,919 | 7/1996 | Yong et al. | 370/61 |
| 5,570,362 | 10/1996 | Nishimura | 370/60.1 |

OTHER PUBLICATIONS

Proposal of Short Cell Format for Low Bit Rate Voice Tomohiro Ishihara ATM Forum/95.
Continuation Packet Protocol D. F. Bantz IBM Technical Discl. Bulletin Apr. 1982.

*Primary Examiner*—Hassan Kizou
*Assistant Examiner*—A. Bnimoussa
*Attorney, Agent, or Firm*—Burns, Doane, Swecker & Mathis, LLP

[57] ABSTRACT

In a telecommunication system that uses asynchronous transfer mode (ATM) with the ATM adaption layer (AALm) protocol as a data transfer infrastructure, a method and apparatus for segmenting and reassembling user data packets. The method and apparatus improve the quality and effectiveness of telecommunication data transfer by avoiding the problems associated with excessively long minicells.

45 Claims, 10 Drawing Sheets

MINICELL HEADER CODED "FIRST SEGMENT"

MINICELL HEADER CODED "MIDDLE SEGMENT"

MINICELL HEADER CODED "LAST SEGMENT"

MINICELL SEGMENTATION AND REASSEMBLY

BACKGROUND

The present invention relates to the transmission of telecommunications data, and more particularly to the transmission of telecommunication data using an asynchronous transfer mode (ATM) protocol. Specifically, the present invention relates to a method and apparatus for segmenting data transmission packets into smaller packets to improve the efficiency of data transmission.

ATM is a standard protocol for transmitting telecommunication data within a telecommunication system (e.g., a cellular telecommunication system). It is based on the transmission of data in fixed size cells, known as ATM cells, where each ATM cell has a 48 octet payload and a five octet header. ATM is well known in the art and is commonly used for low bit rate applications (e.g., cellular voice communication). However, ATM does not efficiently utilize bandwidth in low bit rate applications.

Bandwidth is very expensive; therefore, it is very important to maximize bandwidth utilization. When using ATM for low bit rate communication, bandwidth utilization can be improved by incorporating an ATM adaption layer (AALm) 100 as illustrated in FIG. 1. In general, AALm is based on the compression of user data (e.g., voice data) into small data packets called minicells. AALm can be subdivided into three sublayers: the convergence sublayer 101, the assembly and disassembly (AAD) sublayer 102, and the multiplexing and demultiplexing (MAD) sublayer 103. The convergence sublayer 101 serves as an interface between the telecommunications application (i.e., cellular telephone system) and the AAD sublayer 102. The AAD sublayer 102 inserts user data into minicells at the sending entity (e.g., a cellular telecommunication system base station) and extracts the user data from the minicells at the receiving entity (e.g., a cellular telecommunication system mobile switching center). The MAD sublayer 103 multiplexes the minicells into ATM cells at the sending entity and demultiplexes the minicells at the receiving entity.

FIG. 2 illustrates how known methods, using the AALm 100, insert each packet of user data (e.g., user packet 201) into a single minicell (e.g., minicell 202). In other words, there is a one-to-one relationship between each packet of user data and each minicell. Consequently, the length of each minicell can vary from just a few octets to several hundred octets, depending on the length of the corresponding user packet. In fact, a minicell can be longer than several ATM cells (e.g., minicell 203).

Although the use of ATM with AALm achieves better bandwidth utilization than ATM without AALm, other problems arise due to excessively long minicells, for example, minicells with a data portion that is longer than a predefined length (e.g., ATM cell payload length). First, large minicells introduce large delay variations. Delay variation refers to the variation in data transmission and arrival time. Delay variation typically manifests itself as "jitter" in the telecommunication signal. To avoid jitter, a system must add a delay variation factor to a fixed delay, resulting in larger overall transmission times. Although adding a delay variation factor to the fixed delay reduces jitter, large delays require the use of expensive echo cancelers and they also result in an overall reduction in speech quality. Moreover, low bit rate applications, such as voice communication, are highly dependent upon consistent data transmission delays (i.e., small delay variations); therefore, low bit rate applications are particularly susceptible to the degenerative effects, previously mentioned, caused by the transmission of user data in excessively large minicells.

The second problem involving the use of large minicells arises when the telecommunication network or end equipment switch the minicells from one ATM stream to another. If the minicell user packet is shorter than or equal to the ATM cell payload, there is little problem with placing a minicell in an ATM cell at the switch ingress edge, switching the minicell in a desired direction, extracting the minicell at the egress edge, and multiplexing the minicell into a new ATM stream.

In brief, excessively long minicells, in particular, minicells with data portions that are longer than the ATM cell payload can degrade both speech quality and the effectiveness of network switching equipment, thus creating a need to limit large minicells by segmenting the user data packets.

SUMMARY

It is an objective of the present invention to provide a telecommunication data transfer protocol that effectively utilizes available bandwidth.

It is another object of the invention to provide a telecommunication data transfer protocol that effectively utilizes available bandwidth and reduces the speech quality problems associated with transferring telecommunication data over excessively large minicells.

It is yet another objective of the invention to provide a telecommunication data transfer protocol that effectively utilizes available bandwidth and avoids the problems associated with switching excessively large minicells from one ATM stream to another.

In accordance with one aspect of the present invention, the foregoing and other objects are achieved by a method, apparatus, or a telecommunications system for generating data cells that includes segmenting a data packet into at least two segments; inserting each of the at least two segments into respective minicells; and multiplexing the respective minicells into at least one data cell.

In accordance with another aspect of the invention, a method, apparatus, or telecommunication system for transporting a data packet that includes segmenting the data packet into at least two segments; inserting the at least two segments into respective minicells; multiplexing the respective minicells into at least one data cell; and transmitting the at least one data cell from a sending entity.

BRIEF DESCRIPTION OF THE DRAWINGS

The objects and advantages of the invention will be understood by reading the following detailed description in conjunction with the drawings in which.

DETAILED DESCRIPTION

The present invention segments excessively long user data packets and inserts each segment into a small minicell. In contrast, the known methods transmit the entire user data packet in one long minicell. By segmenting and transmitting a user data packet in smaller minicells, the problems associated with long minicells, such as the degradation of speech quality and the ineffectiveness of network switching equipment, can be reduced or eliminated.

Figure 1:
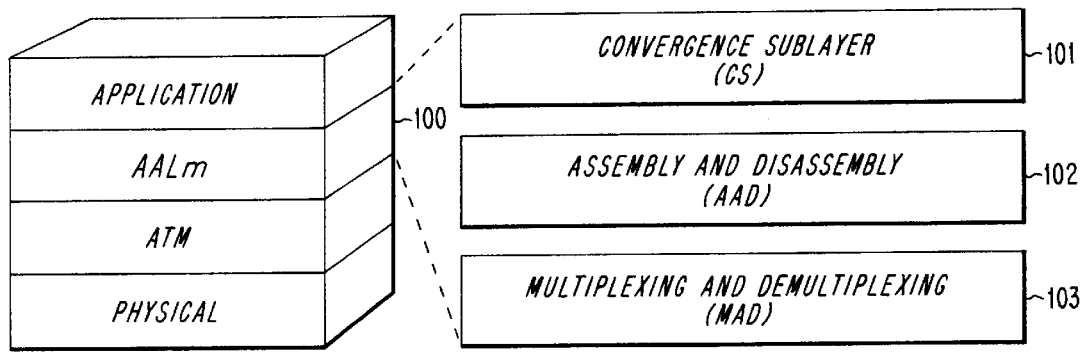
FIG. 1 illustrates a known, AALm protocol model.
Figure 3:
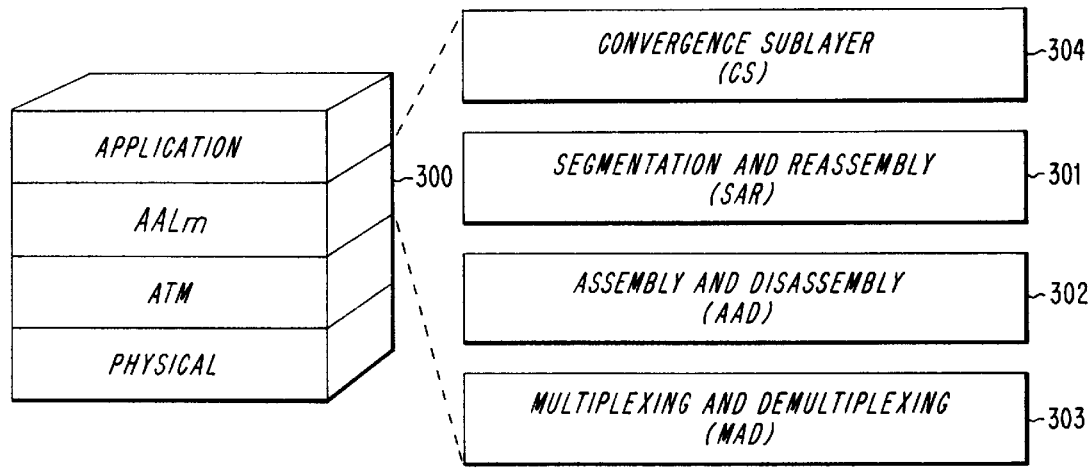
FIG. 3 illustrates the AALm protocol model with the new segmentation and reassembly sublayer.

The present invention accomplishes this by introducing a new functional sublayer for the AALm protocol model. FIG. 3 depicts the AALm 300 with the new functional sublayer 301. The new functional sublayer 301 is called the segmentation and reassembly (SAR) sublayer. The SAR sublayer 301 is invoked if a user data packet is so long that segmentation is necessary to avoid sending user data to a receiving entity in a minicell whose length, excluding the header, exceeds a predefined maximum length (e.g., the ATM payload length).

Figure 4A:
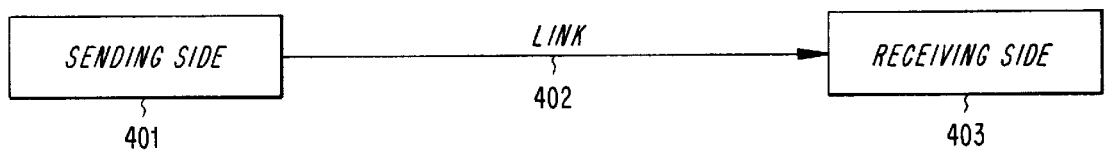
FIGS. 4a and 4b show the method for inserting packets of user data into minicells in accordance with the new segmentation and reassembly sublayer.

FIG. 4a shows a sending entity 401 (e.g., a cellular telecommunication base station), an interconnecting link 402, and a receiving entity 403 (e.g., a mobile switching center). The sending entity 401 and the receiving entity 403 both contain the new protocol model illustrated in FIG. 3. More specifically, the sending entity 401 contains the segmentation part of the SAR sublayer 301 and the receiving entity 403 contains the reassembly part of the SAR sublayer 301. The interconnection link 402 carries the ATM cells from the sending entity 401 to the receiving entity 403, and the ATM cells, in turn, carry the segmented user data (e.g., voice communication signals) in minicells.

Figure 2:
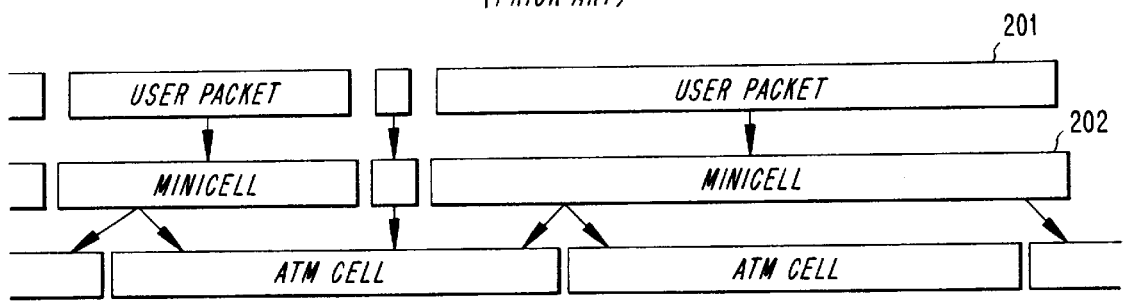
FIG. 2 shows a known method for inserting packets of user data into minicells.
Figure 4B:
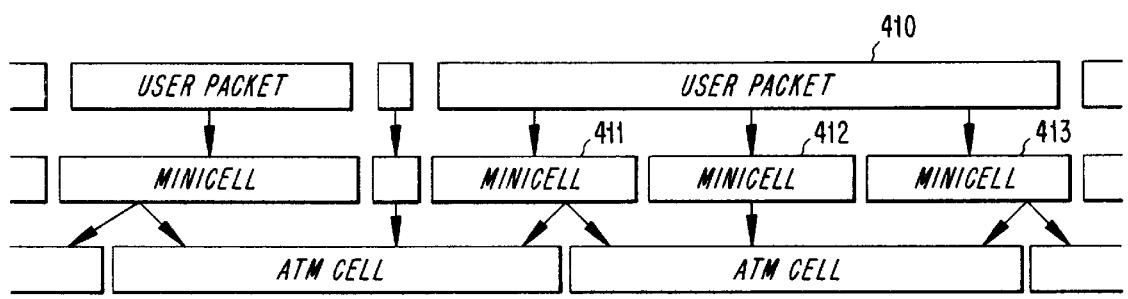

FIG. 4b illustrates how the new AALm protocol model of the present invention takes each long user packet (e.g., user packet 410), segments it, and places it into a number of small minicells, such as minicells 411, 412, and 413. Unlike the known ATM protocol model (refer to FIG. 2), there is no longer a one-to-one correspondence between each user data packet and each minicell. Moreover, FIG. 4b illustrates that a single minicell can overlap no more than one ATM cell border as compared to the known protocol model illustrated in FIG. 2. This is because the length of each minicell, as discussed above, is limited, for example, to a length that is less than the ATM cell payload (i.e., 48 octets).

There are two basic approaches for accomplishing segmentation and reassembly in accordance with the invention. Neither of these approaches are intended to suggest that the present invention is limited to these two approaches. Instead, the two approaches are considered to reflect two particular embodiments of the invention. The first approach or embodiment is called the "three code method". The second approach or embodiment is called the "two code method." In general, both embodiments employ the same basic segmentation strategy. A user packet is divided into several segments. All but the last segment has a fixed and equal length. The length of the last segment is adjusted so that all of the segments together are the same length as the original user packet. The segments are then placed into minicell payloads. Consequently, the length of each minicell payload is the same as the length of each corresponding user packet segment.

Figure 5:
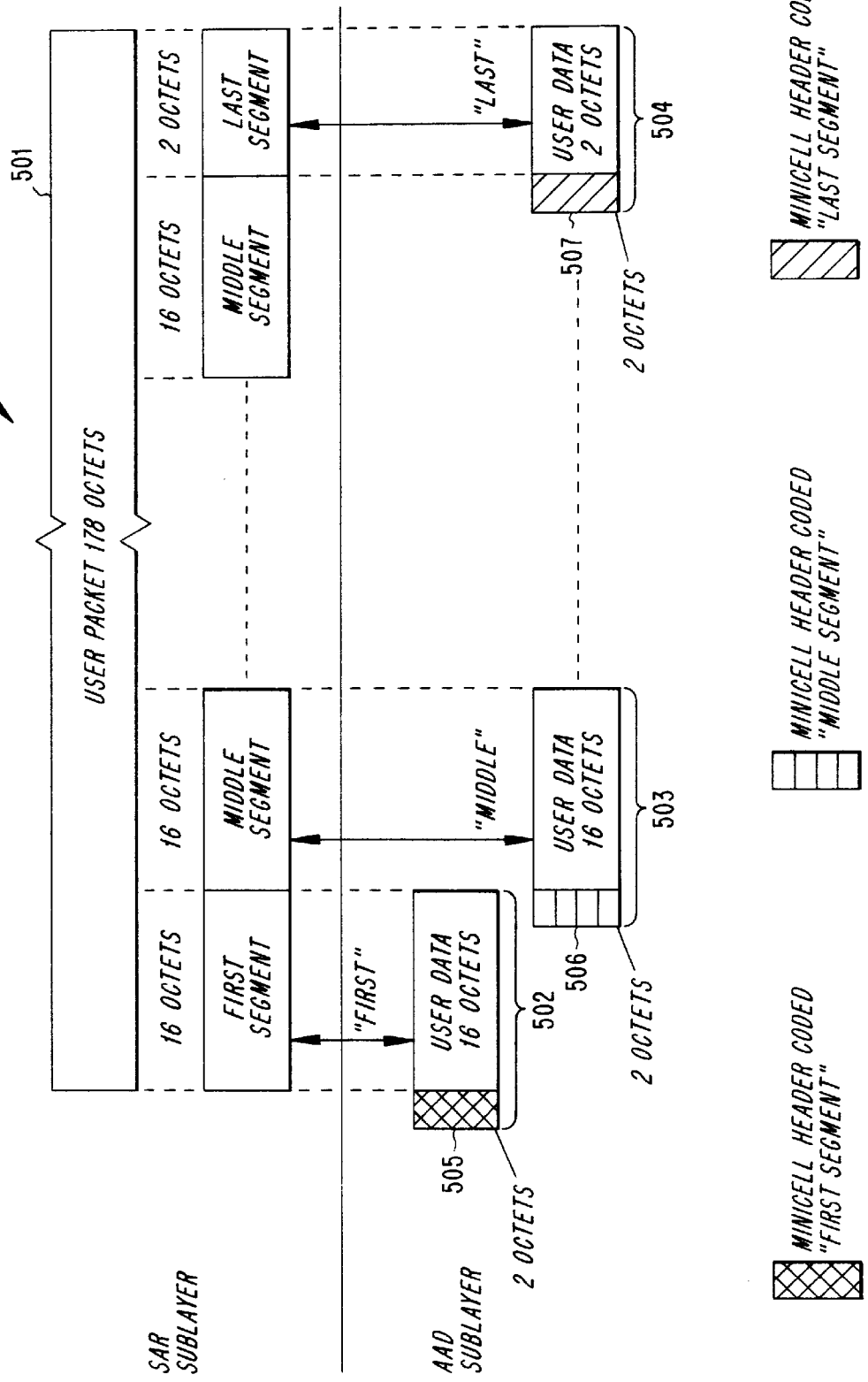
FIG. 5 depicts the segmentation process in accordance with the "three code method"

FIG. 5 shows the segmentation process 500 for the "three code method" or embodiment which is accomplished by the sending entity 401 before transporting the data to a receiving entity 403. For example, suppose that a user packet 501 has a length of 178 octets. The fixed segment size, for illustrative purposes, is set to 16 octets. Those skilled in the art will appreciate, however, that the fixed segment size can be set to any desired size. Therefore, 11 minicells with payloads that are 16 octets long (e.g., minicells 502 and 503) and one minicell with a payload that is two octets long length (e.g., minicell 504) will carry the segmented user packet 501 from the sending entity 401 to the receiving entity 403.

At the sending entity 401, the SAR sublayer 301 invokes the AAD sublayer 302. The AAD sublayer 302 attaches a minicell header to each minicell (e.g., minicell headers 505, 506, and 507). The minicell headers define, among other things, the length of the corresponding payload and whether the minicell corresponds to a "first segment" 502, a "middle segment" 503, or a "last segment" 504.

At the receiving entity 403, the AAD sublayer 302 extracts the minicell headers, which inform the AAD sublayer 302 whether the minicell corresponds to a "first segment", "middle segment", or a "last segment". The AAD sublayer 302 continues to pass the segments to the SAR sublayer 301 which reassembles the segments, one-by-one, back into the original data packet. After the SAR sublayer 301 adds the "last segment" to the data packet, it passes the reassembled data packet to the convergence layer 304.

If the length of the data packet is so short that "middle segments" are not required, the three code embodiment will segment the data packet into a "first segment" and a "last segment" only. If the data packet is so short that it can fit into a single minicell, segmentation is not necessary. In this instance, the sending entity 401 will send the data packet to the receiving entity 403 in a single minicell marked "last segment".

Figure 6:
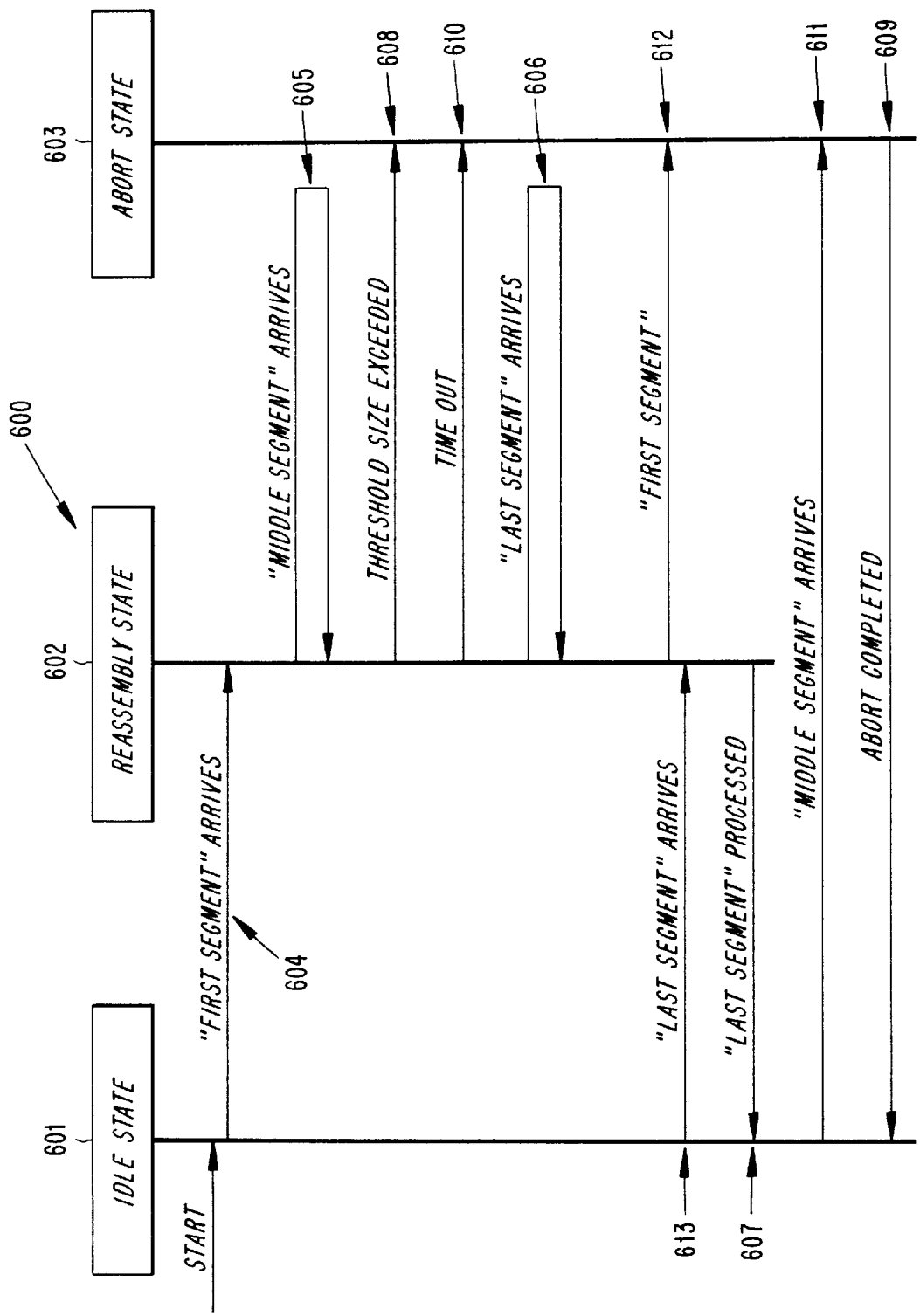
FIG. 6 shows a state diagram representing the reassembly process in accordance with the "three code method"

FIG. 6 shows a state diagram which represents the reassembly process 600 for the three code embodiment. The state diagram comprises three states: an idle state 601, a reassembly state 602, and an abort state 603. At start 620 or power-up, the reassembly process 600 enters the idle state 601. Idle state 601 merely indicates that no reassembly is currently taking place.

Under normal procedures, the reassembly process 600 enters the reassembly state 602 whenever the receiving entity 403 receives a minicell marked "first segment", as illustrated by event 604. The SAR sublayer 301 then stores the user data associated with the "first segment." The reassembly process 600 remains in the reassembly state 602 while the receiving entity 403 receives all of the "middle segments", as illustrated by event 605. As each "middle segment" arrives, the SAR sublayer 301 reassembles the data packet by adding the user data associated with these middle segments, in order, to the user data associated with the "first segment". When the receiving entity 403 receives the "last segment", as illustrated by event 606, the SAR sublayer 301 adds the corresponding user data to the previously stored user data and then presents the fully reassembled user data packet 501 to the next sublayer, for example, the convergence sublayer 304. The reassembly process 600 then reenters the idle state 601, as illustrated by event 607.

When the entire data packet can be contained in a single minicell, there is no need to invoke the SAR sublayer 301 as mentioned above. Therefore, no reassembly will take place at the receiving entity 403. For completeness, FIG. 6 indicates that the reception of a "last segment" while in the idle state 601 causes the reassembly process 600 to enter the reassembly state 602, as illustrated by event 613. The AAD sublayer 302 extracts the user data from the minicell and presents it directly to the sublayer above the SAR sublayer 301, for example, the convergence sublayer 304. After which, the reassembly process 600 reenters the idle state 601.

The reassembly process 600 will enter the abort state 603, if it encounters one or more specific errors. For example, in another embodiment of the invention, a threshold indicating the maximum length of a data packet can be defined. If the SAR sublayer 301, in reassembling the data packet exceeds this maximum length, the reassembly process 600 would enter the abort state 603 to clear the error as illustrated by event 608. Following this, the reassembly process 600 reenters the idle state 601 as illustrated by event 609.

In yet another embodiment of the invention, a time out value could be defined. If, in reassembling a data packet, the SAR sublayer 301 exceeds this time out value, the reassembly process 600 would enter the abort state 603 to clear the error as illustrated by event 610. Following this, the reassembly process 600 reenters the idle state 601 as illustrated by event 609.

If the receiving entity receives a minicell marked "middle segment" while the reassembly process 600 is in the idle state 601, the reassembly process 600 would detect an error and enter the abort state 603 to clear the error as illustrated by event 611. After which, the reassembly process 600 reenters the idle state 601 as illustrated by event 609. Likewise, if the receiving entity 403 receives a minicell marked "first segment" while in the reassembly state 602, the reassembly process 600 would detect an error and enter the abort state 603 to clear the error as illustrated by event 612. After which, the reassembly process 600 reenters the idle state 601 as illustrated by event 609.

Figure 7A:
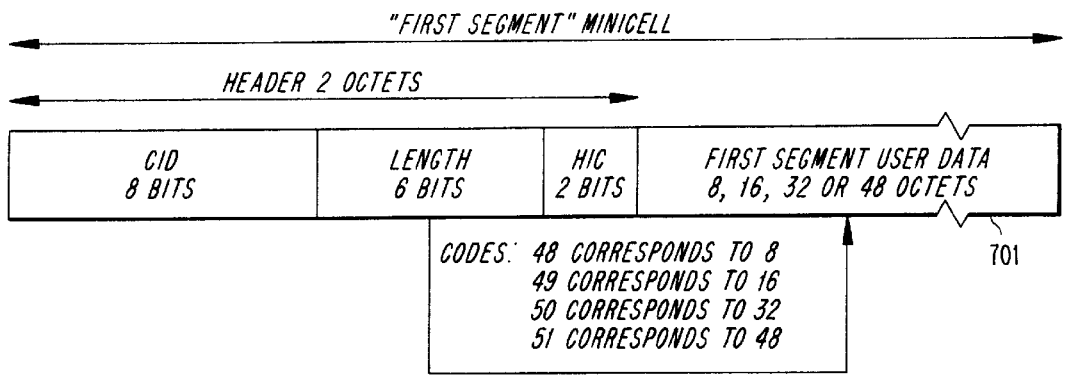
FIG. 7 illustrates the minicell header codes in accordance with the "three code method"
Figure 7B:
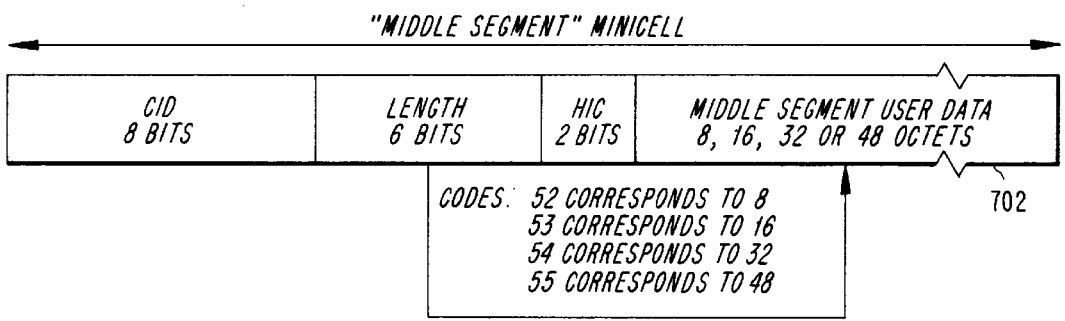
Figure 7C:
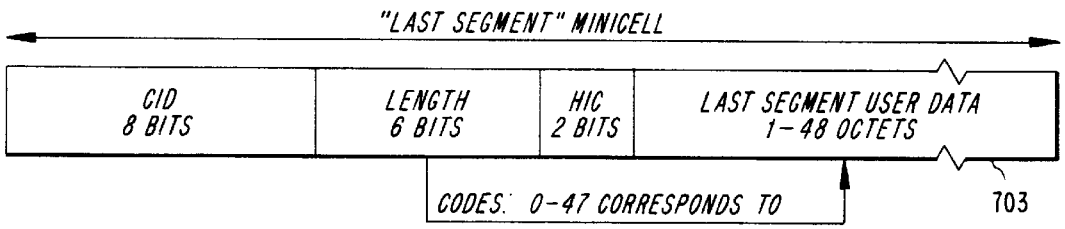

FIGS. 7a, 7b, and 7c show how the minicell headers can be configured to identify whether the corresponding minicell is associated with a "first segment", a "middle segment", and/or a "last segment", as well as the length of the corresponding segment. For example, FIG. 7a illustrates that the four codes 48, 49, 50, and 51 identify the minicell 701 as corresponding to a "first segment" that has a length of 8, 16, 32, or 48 octets respectively. Similarly, FIG. 7b illustrates that the four codes 52, 53, 54, and 55 identify the minicell 702 as corresponding to a "middle segment" that has a length of 8, 16, 32, or 48 octets respectively. FIG. 7c illustrates that codes 0–47 identify the minicell 703 as corresponding to a "last segment" that has a length of 1–48 octets respectively.

The specific codes in FIGS. 7a, 7b, and 7c are illustrative. One skilled in the art will understand that other codes could be used to perform this function and that more or fewer codes could be assigned if needed. However, the specific code values should be predefined in both the sending entity 401 and the receiving entity 403.

This coding strategy permits the SAR sublayer 301 to segment the user data packet as necessary. For example, in yet another embodiment of the invention, the segment length can vary even for segments that correspond to the same user data packet. As illustrated in FIG. 5, the SAR sublayer 301 could segment the user packet 501 into 11 equal segments having a length of 16 octets and one segment with a length of two octets. However, the SAR sublayer 301 could also segment the user packet into a "first segment" having a length of eight octets, three "middle segments" having a length of 16 octets, one "middle segment" having a length of 48 octets, one "middle segment" having a length of 32 octets, and a "last segment" having a length of two octets, for a total length of 178 octets.

FIGS. 7a, 7b, and 7c, illustrate that minicell headers also contain other information. Minicell headers generally include a minicell connection identifier (CID). The CID separates the minicell connections from one another and allows a number of minicell connections to be multiplexed onto the same ATM connection. For example, the CID may identify a particular cellular telephone call; therefore, data packets corresponding to that call would be carried in minicells each having a header that contained the same CID value. It then follows that every minicell corresponding to the same segmented data packet would contain an identical CID value. In an alternative embodiment of the present invention, the length codes, for example 48 through 51 as illustrated in FIG. 7a, could be defined for each CID value. Therefore, every CID value could have its own set of fixed length codes defined at connection set-up. Minicell headers also contain a header integrity check (HIC) code. This code is used to protect the header information by detecting and correcting errors that may occur during the transmission of the minicell from the sending entity 401 to the receiving entity 403. Both CID and HIC codes are well known in the art.

Figure 8:
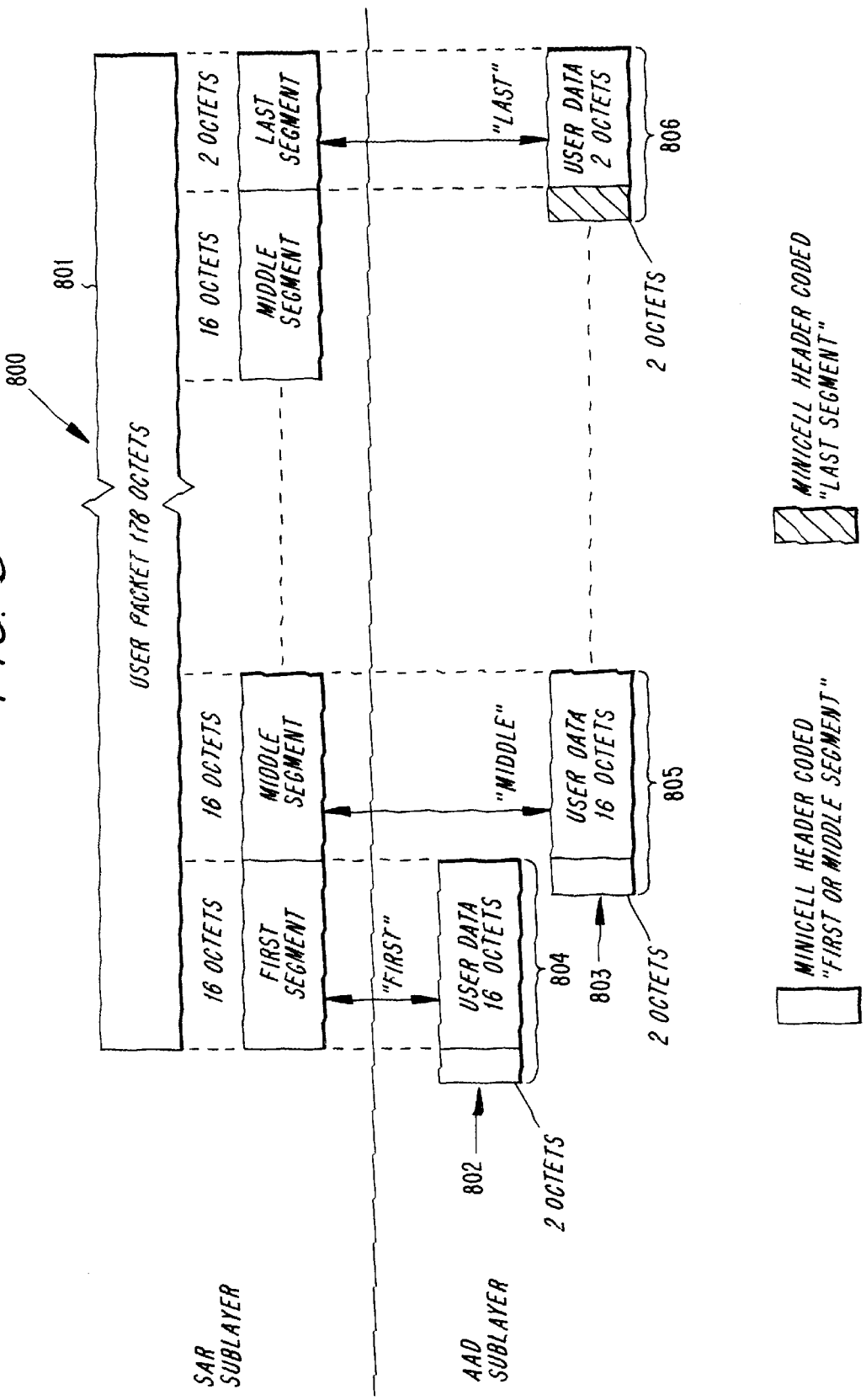
FIG. 8 depicts the segmentation process in accordance with the "three code method"

As discussed above, the second exemplary embodiment of the present invention is called the "two code method". FIG. 8 shows the segmentation process 800 for the "two code method" or embodiment which is accomplished by the sending entity 401 before transporting the data to the receiving entity 403. In most respects, the SAR sublayer 301 segments the user data packet 801 the same way that it would in the three code embodiment, except that, for example, a combined code is used for both the "first segment" and all "middle segments" as illustrated by minicell headers 802 and 803.

For example, suppose that the segmented user packet 801 has a length of 178 octets. Again, the fixed segment size, for illustration, is set to 16 octets. Therefore, 11 minicells with payloads that are 16 octets in length (e.g., minicells 804 and 805) and one minicell with a payload that is two octets in length (e.g., minicell 806) will carry the user packet 801 from the sending entity 401 to the receiving entity 403.

Figure 9:
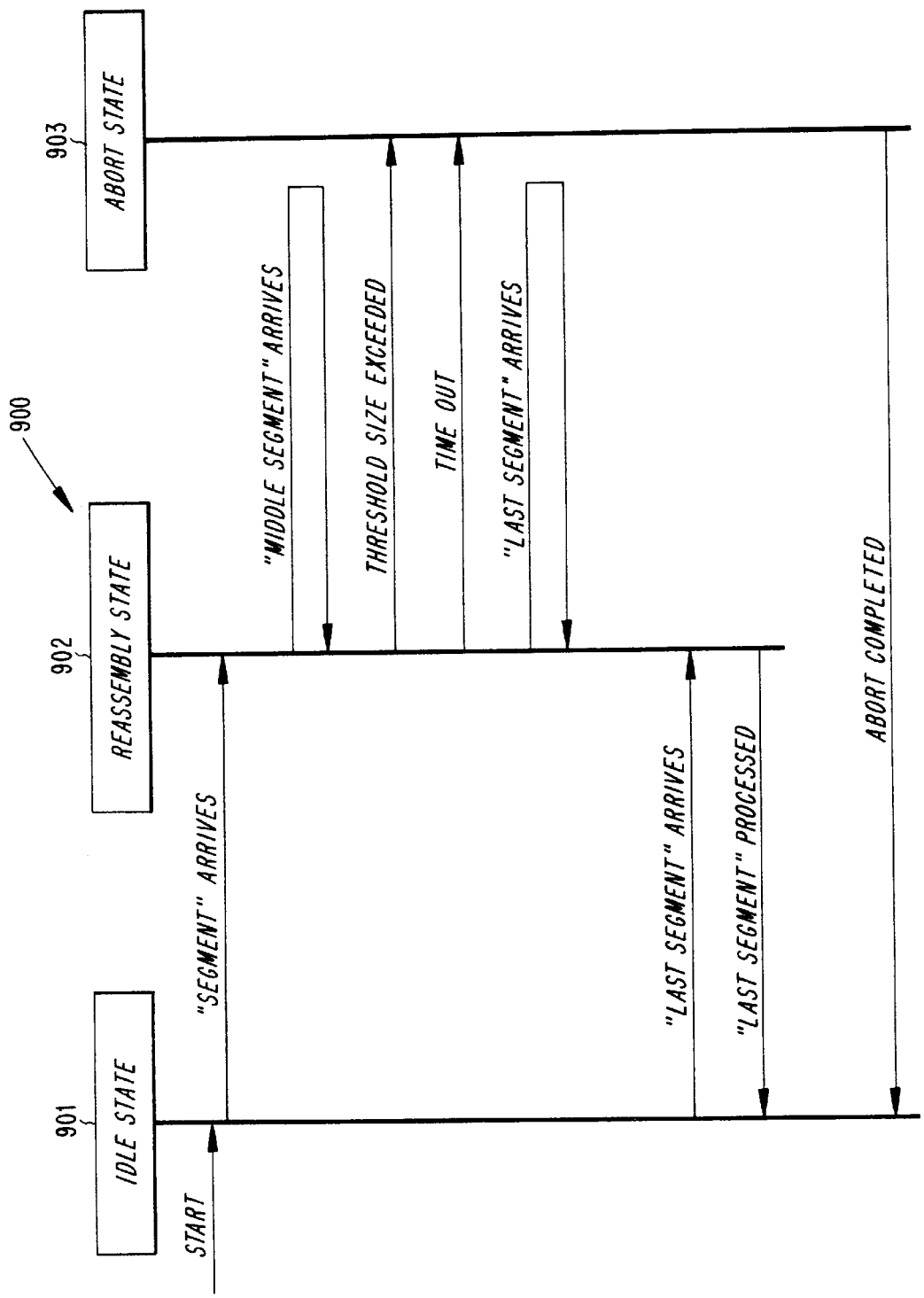
FIG. 9 shows a state diagram representing the reassembly process in accordance with the "three code method"

FIG. 9 illustrates a state diagram which represents the reassembly process 900 for the two code embodiment. Like the state diagram 600 in FIG. 6, the state diagram in FIG. 9 comprises three states: an idle state 901, a reassembly state 902, and an abort state 903. Since each of the events depicted in FIG. 9 are the same as those similarly labelled events described with respect to FIG. 6, such description is not repeated here. However, note that FIG. 9 also illustrates that events 611 and 612 which caused error detections in the reassembly process 600 do not apply in the two code embodiment.

Figure 10A:
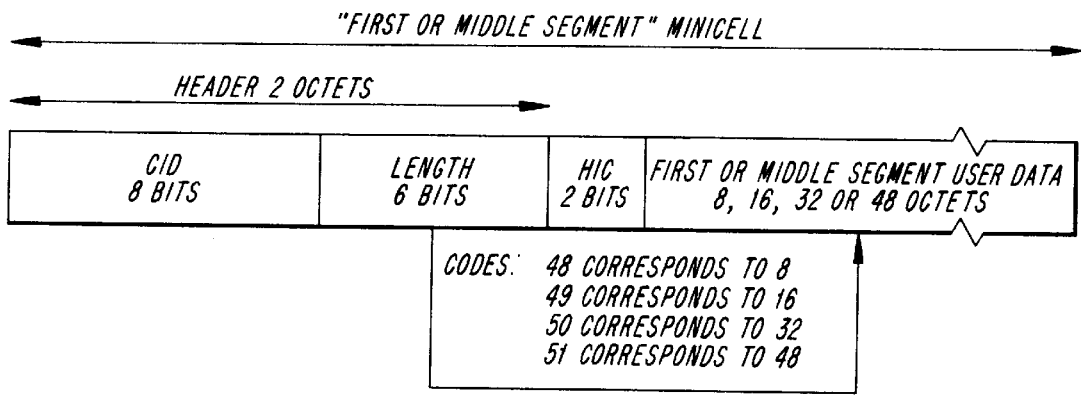
FIG. 10 illustrates the minicell header codes in accordance with the "three code method"
Figure 10B:
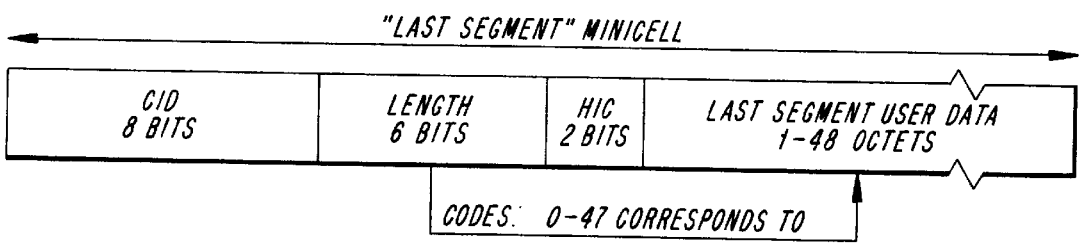

FIGS. 10a and 10b illustrate an example of a coding scheme for the two code embodiment. FIG. 10a specifically shows that fewer codes in the minicell header are required, since there is no need to distinguish between a "first segment" and a "middle segment."

Figure 11:
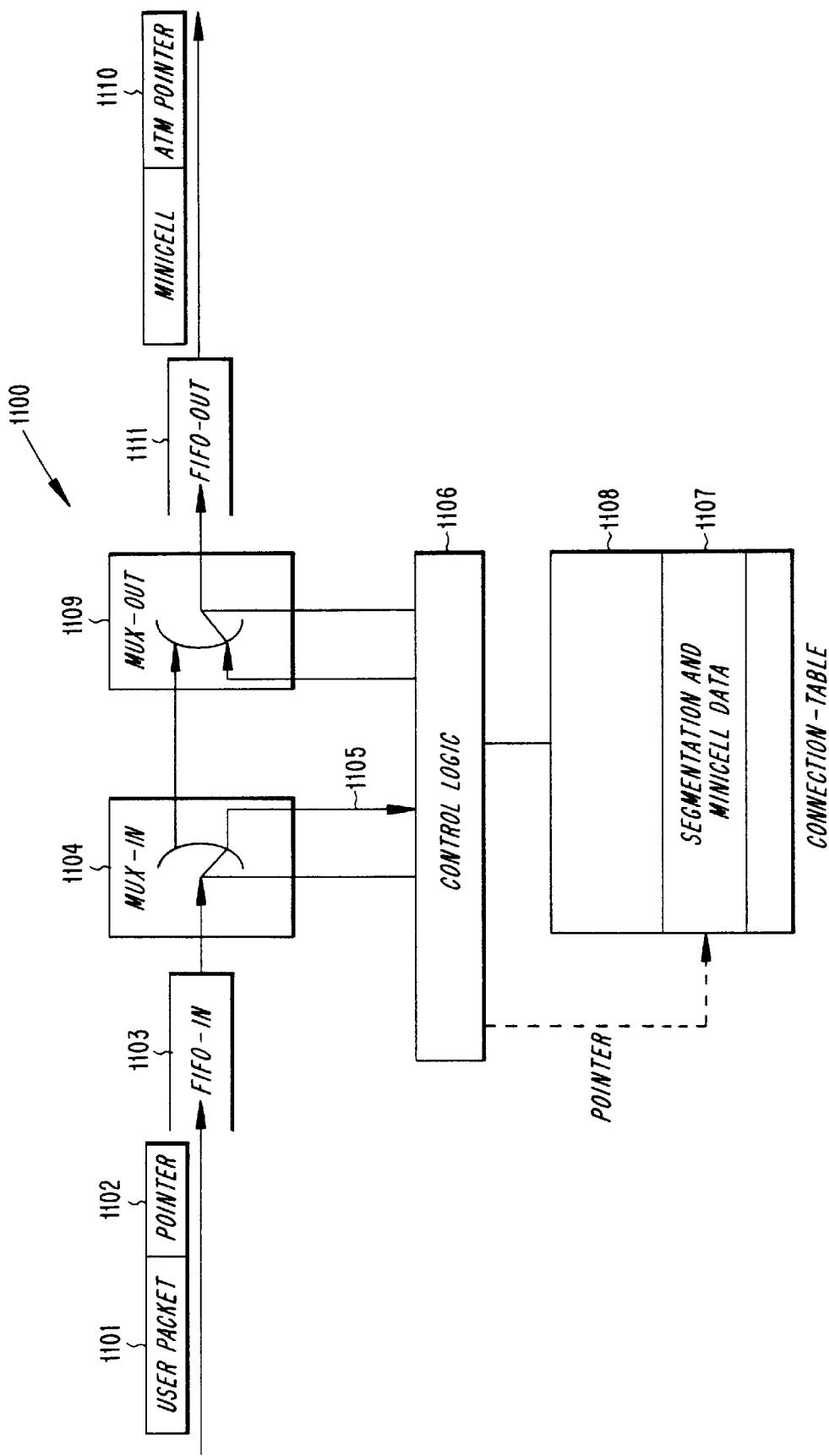
FIG. 11 illustrates an apparatus for segmenting packets of user data and assembling minicells.

FIG. 11 illustrates an exemplary hardware embodiment 1100 for implementing the segmentation and assembly of telecommunication signals using the AALm 300 described above. The AALm 300 first delivers a user packet 1101 from the higher sublayer, (i.e., the convergence sublayer 304), to the SAR sublayer 301. Attached to the user packet 1101 is a pointer 1102 which indicates both the CID and the ATM cell connection. A FIFO-IN 1103 stores and determines the length of the user packet 1101. Then, a multiplexer (MUX-IN) 1104 extracts the pointer 1102 from the user packet 1101 and sends a control signal 1105, representing the information contained in the pointer 1102, to the control logic 1106. The control logic 1106 uses this control signal to select a specific address 1107 in a connection table 1108. The connection table 1108 contains preloaded rules for segmenting user packet 1101 as well as the information needed to construct minicell headers for each segment of user packet 1101. The preloaded rules may, for example, define the specific number of segments, into which the user packet 1101 is to be divided, given the length of the user packet 1101, as well as the length of each individual segment. Moreover, each minicell connection corresponds to a distinct address in connection table 1108. The MUX-IN 1104 calculates the actual size of each segment in accordance with the length of the user packet 1101 (provided by the FIFO-IN 1103) and the preloaded rules stored at address 1107 in connection table 1108.

In order to assemble each minicell, the control logic 1106 fetches the ATM connection and the minicell header information from address 1107 in connection table 1108. The control logic 1106 sends this information to a multiplexer (MUX-OUT) 1109, which generates the minicells by attaching minicell header information to the corresponding segments of user packet 1101 provided by FIFO-IN 1103. The MUX-OUT 1109 also attaches the appropriate ATM connection information to each minicell as illustrated by ATM pointer 1110. The SAR sublayer 301 stores the minicells in a FIFO-OUT 1111 before directing them to the MAD sublayer 302.

In another embodiment of the present invention, the SAR sublayer 301 could employ a plurality of FIFO-IN devices to segment several user packets in parallel. In addition, FIFO-IN 1103 could be co-located in the same position as connection table 1108.

Figure 12:
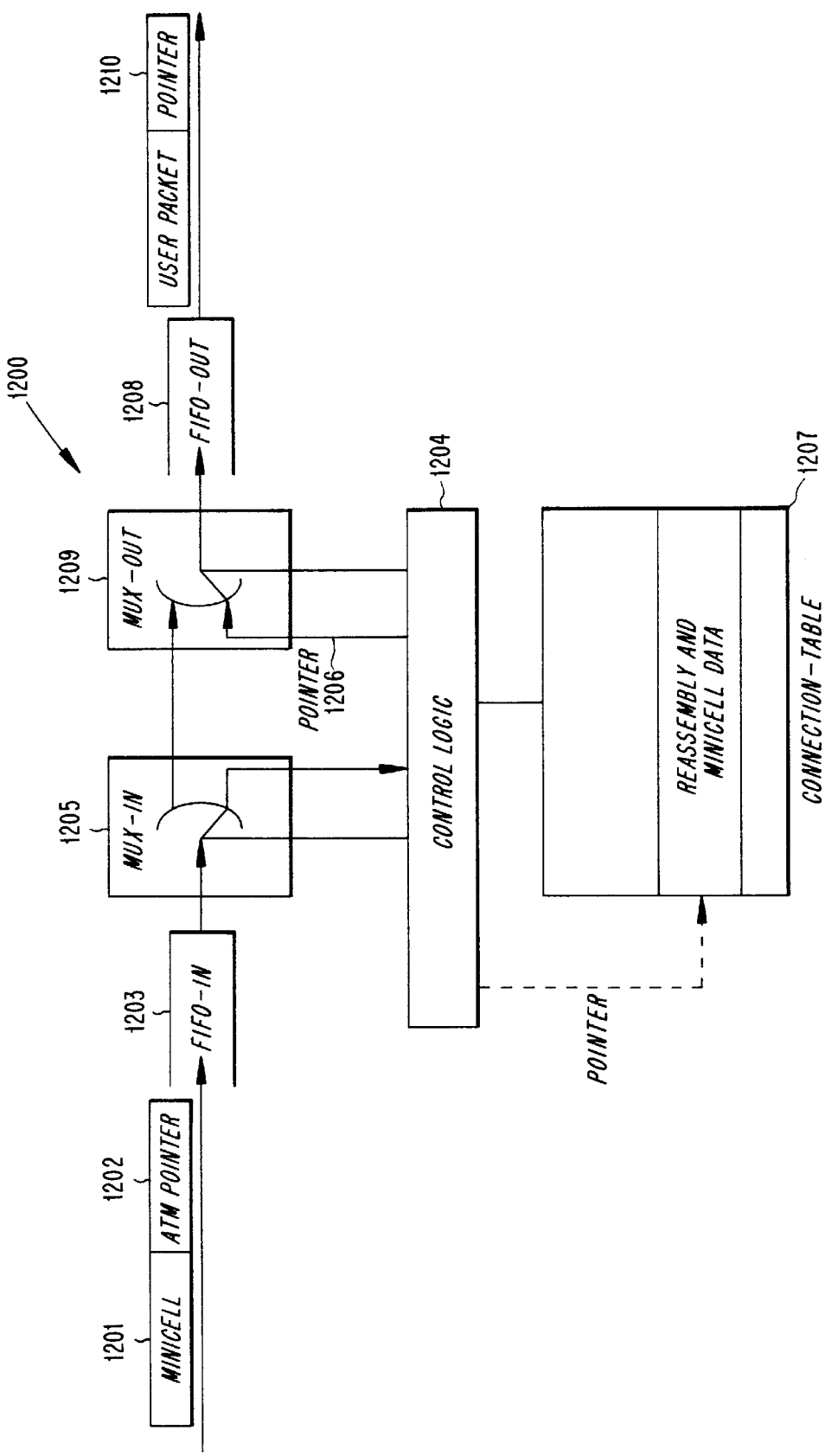
FIG. 12 illustrates an apparatus for the disassembly of minicells and the reassembly of user packets.

FIG. 12 illustrates an exemplary hardware embodiment 1200 for implementing the disassembly of minicells and reassembly of user packets, at the receiving entity 403, using the AALm 300 described above. The process begins when the MAD sublayer 302, at the receiving entity 403, stores a minicell 1201, with a corresponding ATM pointer 1202, in a FIFO-IN 1203. The ATM pointer 1202 indicates the ATM cell from which the minicell was demultiplexed.

Control logic 1204 then extracts the ATM pointer 1202 and the minicell header using a MUX-IN 1205. The minicell header information contains a code, as explained above, which identifies each minicell as being associated with a "first", "middle", or "last segment" (depending upon whether a three code embodiment or a two code embodiment is being used). This, in turn, indicates, for example, whether a new reassembly process is to begin, whether an on-going reassembly process is to continue, or whether a reassembly process is complete.

If the minicell header indicates that a new reassembly process is being initiated, the control logic 1204 fetches a pointer 1206 from the connection table 1207 and places it into FIFO-OUT 1208, along with the data segment associated with the first minicell. The location (i.e., address) of the pointer 1206 is defined by the ATM pointer 1202 in conjunction with the CID in the minicell header. Once the pointer 1206 and the first segment are stored in the FIFO-OUT 1208, all subsequent data segments from consecutive minicells belonging to the same minicell connection (i.e., having the same CID value) are transmitted to the FIFO-OUT 1208 using MUX-IN 1205 and a MUX-OUT 1209. When the "last segment" arrives, the SAR sublayer 301 directs the fully reassembled user packet 1210 to the next sublayer, e.g., the convergence sublayer 304.

As before, the SAR sublayer 301 could employ a plurality of FIFO-OUT devices to reassembly, in parallel, minicells from a plurality of minicell connections. In addition, the FIFO-OUT device 1209 could be co-located in the same position as the connection table 1204.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. In a telecommunications system, a method for generating data cells comprising the steps of:

segmenting a data packet into at least two variable length segments, wherein a number of segments and a length of each segment vary based on a set of segmentation and reassembly rules;

generating minicells by appending a code to each of the at least two segments, wherein each code contains information identifying the length of a corresponding segment; and multiplexing the minicells into at least one data cell.

2. The method of claim 1, wherein the step of segmenting a data packet further comprises the step of:

segmenting the data packet if the data packet is longer than a predefined length.

3. The method of claim 2, wherein the predefined length is the same length as a payload portion of the at least one data cell.

4. The method of claim 1, wherein the code appended to each of the at least two segments further contains information identifying a segment type for the corresponding segment, and wherein the segment type is selected from a group of segment types which includes a first segment type, a second segment type and a last segment type.

5. The method of claim 1, wherein the code appended to each of the at least two segments further contains information identifying a segment type for the corresponding segment, and wherein the segment type is selected from a group of segment types which includes a first segment type and a last segment type.

6. The method of claim 1, wherein the at least one data cell is an asynchronous transfer mode cell.

7. A method in accordance with claim 1, wherein the segmentation and reassembly rules segment the data packet as a function of data packet length.

8. A method in accordance with claim 1, wherein the segmentation and reassembly rules segment the data packet as a function of a corresponding connection identifier code.

9. In a telecommunications system, a method for transporting a data packet comprising the steps of:

segmenting a data packet into at least two variable length segments, wherein a number of segments and a length of each segment vary based on a set of segmentation and reassembly rules;

generating minicells by appending a code to each of the at least two segments, wherein each code contains information identifying the length of a corresponding segment;

multiplexing the minicells into at least one data cell; and transmitting the at least one data cell from a sending entity.

10. The method of claim 8, wherein the step of segmenting the data packet further comprises the step of:

segmenting the data into at least two segments if the data packet is longer than a predefined length.

11. The method of claim 9, wherein the predefined length is the same length as a payload portion of the at least one data cell.

12. The method of claim 8, further comprising the steps of:

receiving the at least one data cell at a receiving entity;

demultiplexing each of the minicells from the at least one data cell as a function of the appended code;

extracting the at least two segments from the respective minicells; and reassembling the data packet by combining the at least two extracted segments.

13. The method of claim 11, wherein the step of reassembling the data packet comprises the step of:

recombining the at least two segments in accordance with the set of segmentation and reassembly rules, wherein the step of recombining the at least two segments continues until a last one of the at least two segments is recombined.

14. The method of claim 8, wherein the code appended to each of the at least two segments further contains information identifying a segment type for the corresponding segment, and wherein the segment type is selected from a group of segment types which includes a first segment type, a second segment type and a last segment type.

15. The method of claim 8, wherein the code appended to each of the at least two segments further contains information identifying a segment type for the corresponding segment, and wherein the segment type is selected from a group of segment types which includes a first segment type and a last segment type.

16. An apparatus for generating data cells comprising:

means for segmenting a data packet into at least two variable length segments, wherein a number of segments and a length of each segment vary based on a set of segmentation and reassembly rules;

means for generating minicells by appending a code to each of the at least two segments, wherein each code contains information identifying the length of a corresponding segment; and means for multiplexing the minicells into at least one data cell.

17. The apparatus of claim 16, wherein the means for segmenting a data packet further comprises:

means for segmenting the data packet into at least two segments if the data packet is longer than a predefined length.

18. The apparatus of claim 17, wherein the predefined length is the same length as a payload portion of the at least one data cell.

19. The apparatus of claim 16, wherein the code appended to each of the at least two segments further contains information identifying a segment type for the corresponding segment, wherein the segment type is selected from a group of segment types which includes a first segment type, a second segment type and a last segment type.

20. The apparatus of claim 16, wherein the code appended to each of the at least two segments further contains information identifying a segment type for the corresponding segment, wherein the segment type is selected from a group of segment types which includes a first segment type and a last segment type.

21. The apparatus of claim 16, wherein the at least one data cell is an asynchronous transfer mode cell.

22. An apparatus in accordance with claim 16, wherein the segmentation and reassembly rules segment the data packet as a function of data packet length.

23. A method in accordance with claim 16, wherein the segmentation and reassembly rules segment the data packet as a function of a corresponding connection identifier code.

24. An apparatus for transporting a data packet comprising:

means for segmenting the data packet into at least two variable length segments, wherein a number of segments and a length of each segment varies based on a set of segmentation and reassembly rules;

means for generating minicells by appending a code to each of the at least two segments, wherein each code contains information identifying the length of a corresponding segment;

means for multiplexing the minicells into at least one data cell; and means for transmitting the at least one data cell from a sending entity.

25. The apparatus of claim 23, wherein the means for segmenting the data packet into at least two segments further comprises:

means for segmenting the data packet into at least two segments if the data packet is longer than a predefined length.

26. The apparatus of claim 24, wherein the predefined length is the same length as a payload portion of the at least one data cell.

27. The apparatus of claim 23, further comprising:

means for receiving the at least one data cell at a receiving entity;

means for demultiplexing each of the respective minicells from the at least one data cell as a function of the appended code;

means for extracting the at least two segments from the minicells; and means for reassembling the data packet by combining the at least two extracted segments.

28. The apparatus of claim 26, wherein the means for reassembling the data packet by combining the at least two extracted segments comprises:

multiplexer means for recombining the at least two segments in accordance with the set of segmentation and reassembly rules until a last segment is recombined.

29. The apparatus of claim 23, wherein the code appended to each of the at least two segments further contains information identifying a segment type for the corresponding segment, and wherein the segment type is selected from a group of segment types which includes a first segment type, a second segment type and a last segment type.

30. The apparatus of claim 23, wherein the code appended to each of the at least two segments further contains information identifying a segment type for the corresponding segment, and wherein the segment type is selected from a group of segment types which includes a first segment type and a last segment type.

31. A telecommunication system for generating data cells comprising:

a control logic circuit for segmenting a data packet into at least two variable length segments, wherein a number of segments and a length of each segment vary based on a set of segmentation and reassembly rules;

a first multiplexer for generating minicells by appending a code to each of the at least two segments, wherein each code contains information identifying the length of a corresponding segment; and a second multiplexer for inserting the minicells into at least one data cell.

32. The telecommunications system of claim 31, wherein the control logic circuit segments the data packet if the data packet length is longer than a predefined length.

33. The telecommunications system of claim 32, wherein the predefined length is the same length as a payload portion of the at least one data cell.

34. The telecommunications system of claim 31, wherein the code appended to each of the at least two segments further contains information identifying a segment type for the corresponding segment, and wherein the segment type is selected from a group of segment types which includes a first segment type, a second segment type and a last segment type.

35. The telecommunications system of claim 31, wherein the code appended to each of the at least two segments further contains information identifying a segment type for the corresponding segment, and wherein the segment type is selected from a group of segment types which includes a first segment type and a last segment type.

36. The telecommunications system of claim 31, wherein the at least one data cell is an asynchronous transfer mode cell.

37. A system in accordance with claim 31, wherein the segmentation and reassembly rules segment the data packet as a function of data packet length.

38. A system in accordance with claim 31, wherein the segmentation and reassembly rules segment the data packet as a function of a corresponding connection identifier code.

39. A telecommunications system for transporting a data packet comprising:

a control logic circuit for segmenting a data packet into at least two variable length segments wherein a number of segments and a length of each segment vary based on a set of segmentation and reassembly rules;

a first multiplexer for generating minicells by appending a code to each of the at least two segments wherein each code contains information identifying the length of a corresponding segment;

a second multiplexer for inserting the minicells into at least one data cell; and a transmitter for transmitting the at least one data cell from a sending entity.

40. The telecommunications system of claim 38, wherein the control logic circuit segments the data packet into at least two segments if the data packet is longer than a predefined length.

41. The telecommunications system of claim 39, wherein the predefined length is the same length as a payload portion of the at least one data cell.

42. The telecommunications system of claim 38, further comprising:

a first data buffer for receiving the at least one data cell at a receiving entity;

a demultiplexer for extracting each of the minicells from the at least one data cell as a function of the appended code;

a second demultiplexer for extracting the at least two segments from their respective minicells; and a second control logic circuit for controlling the reassembly of the data packet by recombining the at least two extracted segments.

43. The telecommunications system of claim 41, wherein the second control logic circuit recombines the at least two segments in accordance with the set of segmentation and reassembly rules until a last segment is recombined.

44. The telecommunications system of claim 38, wherein the code appended to each of the at least two segments further contains information identifying a segment type for the corresponding segment, and wherein the segment type is selected from a group of segment types which includes a first segment type, a second segment type and a last segment type.

45. The telecommunications system of claim 38, wherein the code appended to each of the at least two segments further contains information identifying a segment type for the corresponding segment, and wherein the segment type is selected from a group of segment types which includes a first segment type and a last segment type.

\* \* \* \* \*